United States Patent
Zahn

[11] 3,715,147
[45] Feb. 6, 1973

[54] SEALING RING ARRANGEMENT FOR ANTI-FRICTION BEARINGS

[75] Inventor: Gunter Zahn, Dusseldorf, Germany
[73] Assignee: Ziller & Co., Dusseldorf, Germany
[22] Filed: Sept. 2, 1970
[21] Appl. No.: 69,052

Related U.S. Application Data

[62] Division of Ser. No. 781,814, Dec. 6, 1968, Pat. No. 3,586,404.

[30] Foreign Application Priority Data

Dec. 14, 1967 Germany..................P 16 25 661.4

[52] U.S. Cl. .................308/187.2, 277/81, 277/94
[51] Int. Cl. ..............................................F16c 33/78
[58] Field of Search ....308/187.1, 187.2; 277/81, 89, 277/94

[56] References Cited

UNITED STATES PATENTS

| | | | |
|---|---|---|---|
| 2,639,954 | 5/1953 | Potter | 308/187.2 |
| 3,129,985 | 4/1964 | Watson | 308/187.1 |
| 3,250,580 | 5/1966 | Sikora | 308/187.1 |
| 2,718,441 | 9/1955 | Smith | 308/187.2 |

*Primary Examiner*—Milton Kaufman
*Assistant Examiner*—Barry Grossman
*Attorney*—Walter Becker

[57] ABSTRACT

A sealing ring and mounting thereof for an anti-friction bearing, which has a sealing edge for resiliently engaging one end face of one race ring of an anti-friction bearing and also has a conically shaped arm for engagement with a conical surface on either the other ring of the anti-friction bearing or a conical surface of a housing or a shaft.

2 Claims, 2 Drawing Figures

SEALING RING ARRANGEMENT FOR ANTI-FRICTION BEARINGS

This is a division of my co-pending application Ser. No. 781,814 filed Dec. 6, 1968 now U.S. Pat. No. 3,586,404-Zahn issued June 22, 1971 and based upon priority of my German application.

The present invention relates to sealing rings for antifriction bearings, which by means of their sealing edge resiliently and approximately perpendicularly engage the end face of one of the bearing rings and which are provided with a centering contact surface extending in the axial direction. The clamping of these known sealing rings is effected on a special clamping surface which is formed on them and which is clamped fast to the anti-friction bearing. Sealing rings of this type, which are made of metallic material, are generally known as spring washers.

The use of sealing rings of this type, however, gives rise to difficulties in many cases because of the necessary clamping between the bearing and the contact shoulder, which, however, is essential in order to seat these sealing rings in such a manner that they will not slip. Thus, for example, it is not possible to provide any considerable rounding radii or grinding grooves on the shaft or casing between the bearing seat and the contact shoulder. Although radiusing or a grinding groove does not impair the clamping of the washers, it is nevertheless detrimental to the indispensable accurate centering of the sealing ring. Thus, it is possible for the clamping surface to be deformed during the clamping between the bearing seat and the contact shoulder because of the inaccurate contact with the radiusing so that the sealing ring tilts on one side of the bearing and the sealing edge does not make perfect contact. However, radiusing or grinding grooves at the clamping point cannot always be avoided when economical methods of manufacture are employed.

It has also already been proposed to use at these points spring washers of the type which by means of a cylindrical contact surface center the sealing ring clamped between the bearing seat and the contact shoulder thereby at least partly overcoming the above-described difficulties. Nevertheless, even sealing rings of this type do not always satisfy the requirements imposed, since in many cases the material on the clamping surface is destroyed by dynamic axial forces. Particularly when spring washers are used on vehicle axles, difficulties occur in the sealing of not only tapered roller bearings but also grooved ball bearings. This is due to the fact that during operation of the vehicle, the clamping surface of the sealing ring is destroyed by hammering. In order to avoid this drawback, in the manufacture of the spring washers it would be necessary to use a material of the same hardness as that used for the anti-friction bearing or the other parts of the axle. Due to the shape of the sealing rings, which is obtained predominantly by non-cutting shaping, the use of such a material is impossible.

It has therefore been attempted to use spring washers having shortened clamping surfaces, which, for example, come to lie in recesses in the axle journal and are thus relieved of the action of heavy axial forces. In order to achieve perfect clamping, very great accuracy is necessary for the recesses in the journals, and such accuracy cannot generally be obtained in the course of series manufacture. Moreover, these measures entailed further difficulties because, for example, in the case of tapered roller bearings, large axial tolerances must be covered, which however, entails high frictional moments at the sealing edge and considerable permanent deformation of the sealing rings.

It has furthermore been proposed to use shaft seals of oil-resistant rubber for shafts mounted in casings with anti-friction bearings, said seals having a conical outer rim and being inserted directly at the side of the anti-friction bearing in a similarly shaped annular groove cross-section. These seals, which are made of rubber, have an obliquely positioned sealing lip which is pushed onto the shaft under initial stress, while the outer rim of the sealing ring must be elastically deformed in order to be able to be inserted into the annular groove cross-section situated at a lower level. A sealing ring of this type, however, is provided with a conically shaped outer rim solely in order to enable the sealing ring to spring elastically into the annular groove in the casing bore. In this case it is not possible to speak of the clamping of the sealing ring in the conventional sense.

It is, therefore, an object of this invention so to design a sealing ring of the first-described type that, without having an actual clamping surface, it will insure perfect slip-proof clamping, even in the event of high frictional moments at the sealing edge.

It is a further object of this invention to provide a sealing ring as set forth in the preceding paragraph, which will bring about the exact centering of the sealing ring as heretofore.

These and other objects and advantages of the invention will appear more clearly from the following specification in connection with the accompanying drawings, in which:

FIG. 2 illustrates a sealing ring according to the invention, in which the conical surface of the sealing ring is tapering in the direction in which the pressing force of the sealing ring is exerted, whereas FIG. 1 illustrates the arrangement of a sealing ring inside an anti-friction bearing.

Figure 1:
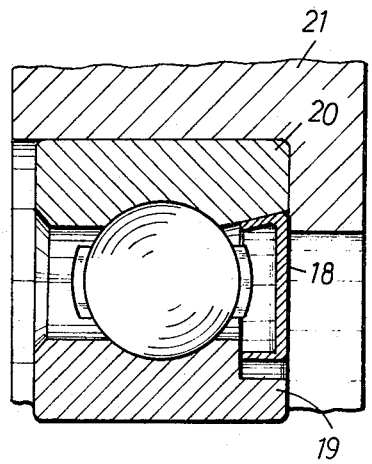
FIG. 1 illustrates a sealing ring in which the conical seat is directed in a direction opposite to the direction in which the pressuring force of the sealing ring acts.

A sealing ring according to the present invention for anti-friction bearings, which has a sealing edge adapted to resiliently and approximately vertically engage the end face of an anti-friction bearing ring and which is provided with an axially extending centering contact surface, is characterized primarily in that said contact surface is conical and simultaneously serves for clamping and centering of the sealing ring. To this end the invention provides for the conical contact surface to be provided with a cone angle which is smaller than the angle of friction between the sealing ring and the cone seat. A centering contact surface of self-locking construction of this type offers very great advantages for the use of spring washers. Not only is a particularly simple form of sealing ring achieved, but also because of the possibility of pushing it onto the cone seat, a reliable method of working for the correct installation of a sealing ring of this type is provided. In this way, for example, the initial tension of the sealing edge can be accurately determined by the manufacturer, so that incorrect fitting is practically impossible. In addition, no clamping surface parts exist which could be exposed to heavy axial forces. It is merely necessary to make a cone surface for the seating of the sealing ring.

The practical realization of the invention provides for the simultaneous clamping and centering of a sealing ring on a shaft or casing shoulder, the conical surface of which is inclined in the direction in which the pressure force acts upon the sealing ring. With this form of the conical seat, the sealing ring is bounded at its outer edge of the conical surface by the end face of the other bearing ring, so that accurate adjustment of the initial stress can be effected. In the case of tapered roller bearings, moreover, with high axial tolerances, the spring washers are automatically pushed onto the cone so that the slip-proof seating of the sealing ring can only be improved by the pushing on. Another advantage of this construction is that only very small permanent deformations can occur, since in the case of greater initial stresses, the sealing ring itself is not deformed but on the contrary, axial displacement will occur.

Sealing rings according to the invention can also be disposed inside an anti-friction bearing, so that a completely sealed anti-friction bearing is formed. In this case it is convenient to provide a conical clamping surface which is inclined in a direction opposite to the direction in which the pressure force of the sealing ring acts, and which can be clamped and centered on a conical seat in the peripheral surface of the inner or outer bearing ring. A construction of this type is simple and convenient to manufacture and, due to the small space required, can without difficulty be disposed between the inner and outer anti-friction bearing rings, without projecting beyond the actual anti-friction bearing ring.

While in most cases pushing onto the conical seating surface will suffice for the sealing ring in the bearing, it will be convenient for some constructions for the conical seat to be bounded in the axial direction by a contact shoulder provided in the design. This can be achieved without particular expense in all cases by means of a casing projection, a shoulder on the shaft, or by a bearing cover which is already provided in many cases. It is sufficient for the diameter of the bounding contact shoulder to be a few millimeters larger, depending on the size of the sealing ring, than the largest diameter of the conical seat for sealing rings having sealing edges lying against the outer bearing ring. If sealing rings having sealing edges lying against the inner bearing ring should be used, the inner diameter of the contact shoulder must be correspondingly smaller than the smallest diameter of the conical seat.

An embodiment is shown in FIG. 1, where a sealing ring 18 is disposed inside an anti-friction bearing so that the sealing edge lies perpendicularly against a shoulder on the inner ring 19, while the contact shoulder of the sealing ring 18 is pushed with a conical seat onto the outer ring 20. In this instance, the contact shoulder is formed by a shoulder on the casing 21.

Figure 2:
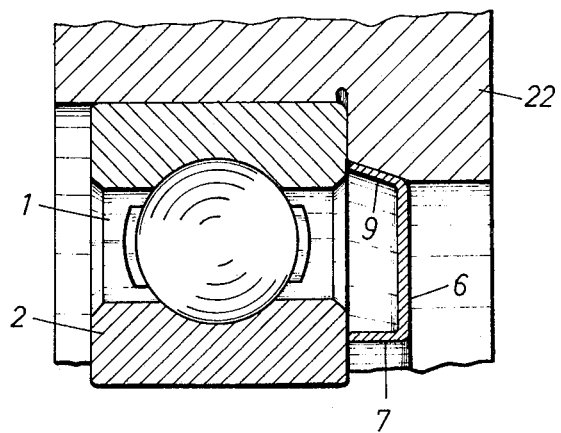

FIG. 2 illustrates a sealing ring 6 but the sealing edge 7 engages the inner ring 2 of the anti-friction bearing 1. The contact surface 9 of this sealing ring is pushed onto a conical surface of the casing 22 before the anti-friction bearing is installed.

In all practical examples of embodiment of the invention the particular advantage consists in that the clamping and centering of a sealing ring can be achieved by means of a single contact surface. It is thus assured that sealing rings cannot be incorrectly fitted because of the existence of radiusing or grinding grooves, and also that the necessary clamping surfaces cannot be destroyed by dynamic axial forces. For the arrangement of the sealing ring in the construction of the bearing, it is merely necessary to make the conical seat on the shaft shoulder, casing, or on a ring of the anti-friction bearing. Time-consuming formation of recesses and the consequent observance of very great accuracy are no longer necessary. The large axial tolerances which exist particularly in the case of tapered roller bearings can also be very well covered by the forms of seals proposed, without the sealing discs being subjected to permanent deformation.

In all arrangements in which a sealing ring according to the invention is fitted on a shaft or casing shoulder, it is convenient for the conical surface to be inclined in the direction of the pressure force of the sealing ring. If the proposed self-locking cone angle is selected, particularly good slip-proof seating of the sealing ring is thereby insured. Since it is necessary to use softer material for the sealing ring than, for example, for anti-friction bearings, the automatic positioning of the sealing ring will within certain limits also result in a reduction of the initial stress and therefore also in less friction at the sealing edge. In this connection, however, it is an important point that the slip-proof seating of the sealing ring is always greater when the latter is pushed into position in this manner. In the case of tapered roller bearings which in view of the large axial tolerances are sealed with high initial stresses, a reduction of the initial stress is, however, entirely permissible.

If, on the other hand, the sealing ring according to the invention is disposed inside an anti-friction bearing, it is necessary for the conical seat to be inclined oppositely to the pressure force of the sealing ring. This is possible in almost all anti-friction bearings, the conical seat being provided in the peripheral surface of the inner or outer bearing ring. The fitting of the sealing rings provided for this purpose can be further simplified by using sealing rings which first have a cylindrical contact surface, so that when the sealing ring is pushed onto the conical seat, a plastic deformation of the clamping surface takes place. Particularly good seating of the sealing ring is thereby achieved, which adapts itself by force constraint to the contact surface provided in the anti-friction bearing ring. In the designing of the sealing rings it is convenient to bound the conical seat in the axial direction by a special contact shoulder.

The embodiments of the invention described with reference to the drawings were selected only in order to illustrate the principles of the invention. Thus, the shape of the sealing ring is not tied to the examples illustrated. In many cases it is dependent on the space available for the seal at the bearing. In the case of vehicle axles, for example, this space can often be utilized only by a special shape of the sealing ring.

Sealing rings according to the invention are, moreover, not restricted to a degree of hardness determined by a material. Since the clamping surface cannot be damaged by the clamping of the sealing ring, both softer and harder material may be used as required. In certain circumstances it is even possible to provide zones of material of different hardness within the sealing ring, that is to say, for example, a cylindrically-shaped clamping surface of soft material adapted to be pushed onto the conical seat, while the sealing edge portion of the sealing ring is made of harder material in order to obtain a perfect seal.

It is, of course, to be understood that the present invention is not limited to the particular showing in the drawings, but also comprises modifications within the scope of the appended claims.

What I claim is:

1. In combination with first means comprising supporting means and with second means comprising an anti-friction bearing supported by said supporting means and having an outer race ring and an inner race ring: a sealing ring having a radially extending annular portion provided at its outer end with a first annular bent-off portion and at its inner end with a second annular bent-off portion, one of said annular bent-off portions having its free end forming a sealing edge in resilient sealing engagement with an end face of one of said race rings, and the other annular bent-off portion of said sealing ring forming an annular conically shaped clamping and centering surface for engagement with one of said first and second means and for clamping and centering said sealing ring thereon, said sealing ring being located with said anti-friction bearing, and one of said race rings having a tapering surface engaged by said conically shaped clamping and centering surface of said sealing ring.

2. A sealing ring for an anti-friction bearing in combination having an annular intermediate radial portion and two bent-off portions respectively bent-off angularly from and integral with the ends of said intermediate portion to cooperate with each of the two bearing races, one of said bent-off portions being perpendicular to said radial portion and forming a sealing edge adapted to resiliently bear sealingly against one of the races and the other one of said bent-off portions defining a hollow cone forming a clamping and centering surface adapted to resiliently bear sealingly against the other one of the races.

* * * * *